United States Patent [19]
Schäty et al.

[11] Patent Number: 5,271,587
[45] Date of Patent: Dec. 21, 1993

[54] CLIP FOR FOR PIPES AND CABLES

[75] Inventors: Harald Schäty, Wetzlar; Ernst-Ludwig Hahn, Rabenau, both of Fed. Rep. of Germany

[73] Assignee: Emhart Inc., Newark, Del.

[21] Appl. No.: 895,498

[22] Filed: Jun. 8, 1992

[30] Foreign Application Priority Data

Jun. 7, 1991 [DE] Fed. Rep. of Germany ....... 9107041

[51] Int. Cl.⁵ ............................................. F16L 3/22
[52] U.S. Cl. ................................... 248/68.1; 248/741
[58] Field of Search ................ 248/68.1, 69, 67.5, 248/74.1, 74.2, 74.3, 316.1

[56] References Cited

U.S. PATENT DOCUMENTS

| | | | |
|---|---|---|---|
| 4,023,758 | 5/1977 | Yuda | 248/73 |
| 4,541,602 | 9/1985 | Potzas | 248/68.1 X |
| 4,550,891 | 11/1985 | Schaty | 248/68.1 |
| 4,566,660 | 1/1986 | Anscher et al. | 248/74.2 |
| 4,762,296 | 8/1988 | Kraus et al. | 248/74.2 |
| 4,899,964 | 2/1990 | Sick | 248/68.1 |
| 5,033,701 | 7/1991 | Kraus | 248/68.1 |

FOREIGN PATENT DOCUMENTS

| | | |
|---|---|---|
| 0088203 | 9/1983 | European Pat. Off. . |
| 3029975 | 3/1982 | Fed. Rep. of Germany . |
| 1577684 | 8/1969 | France . |
| 2385966 | 10/1978 | France . |
| 2081363 | 2/1982 | United Kingdom . |

Primary Examiner—Ramon O. Ramirez
Attorney, Agent, or Firm—Spencer T. Smith

[57] ABSTRACT

A clip for the retention of pipes and cables of various diameters or thicknesses comprising a first pair of resilient support members spaced apart by a distance smaller than the diameter of the smallest object to be retained and supported, the resilient support members being temporarily displaceable to allow the object to press between the support members and the support members resuming their original position after the passage of the object so as to retain the object and further comprising as opposing resilient support members a pair of flexible fingers which are arranged scissor-wise side-by-side and adapted to urge the object towards the first pair of resilient support members so that the object is maintained in contact therewith.

The first pair of resilient support members may take the form of relatively short resilient fingers or may be flexible fin-like members extending across the clip.

3 Claims, 1 Drawing Sheet

CLIP FOR FOR PIPES AND CABLES

BACKGROUND OF THE INVENTION

The present invention relates to a clip for fixing elongate articles such as pipes and cables for example to a machine or vehicle. Such clips are often mounted so that they can support and retain pipes and cables securely but without damage to the pipes and cables or to the object on which the pipes and cables are to be supported.

It is an object of the present invention to provide a clip one size of which is adapted to support pipes etc. of a range of sizes, varying by say up to about 50% in diameter.

It is a further object of the present invention to provide such an improved clip which is simple to manufacture and easy to assemble and use.

BRIEF DESCRIPTION OF THE INVENTION

According to the present invention, we provide a clip for the retention of pipe or cable of a range of diameters or thicknesses comprising a first pair of resilient support members spaced apart by a distance smaller than the diameter of the smallest object to be retained and supported, the resilient support members being temporarily displaceable to allow the object to press between the support members and the support members resuming their original position after the passage of the object so as to retain the object characterised by further comprising as opposing resilient support members a pair of flexible fingers which are arranged scissor-wise side-by-side and adapted to urge the object towards the first pair of resilient support members so that the object is maintained in contact therewith.

The first pair of resilient support members may take the form of relatively short resilient fingers or may be flexible fin-like members extending across the clip.

BRIEF DESCRIPTION OF THE DRAWINGS

In order that the present invention can be better understood, we will now describe in greater detail by way of example a preferred embodiment of a clip unit incorporating a pair of clips according to the present invention with reference to the accompanying drawings in which.

DETAILED DESCRIPTION OF THE DRAWINGS AND PREFERRED EMBODIMENT

The present invention relates to the clip adapted to hold a range of sizes of pipe or cable and the illustrated unit, carrying two clips according to the invention in addition to one other clip, is described by way of example to illustrate the invention. Clearly, many other units incorporating the invention are possible.

The drawings show a clip unit incorporating one clip for holding for example a cable or pipe of 16.0 mm diameter and two clips designed in accordance with the invention, each to hold a cable or pipe in a range of say 4.75 mm to 8.0 mm diameter. For the sake of illustrating the range of the invention, the Figures have been drawn to show one clip carrying a pipe of 4.75 mm diameter and the other clip carrying a pipe of 8.0 mm diameter.

Figure 1:
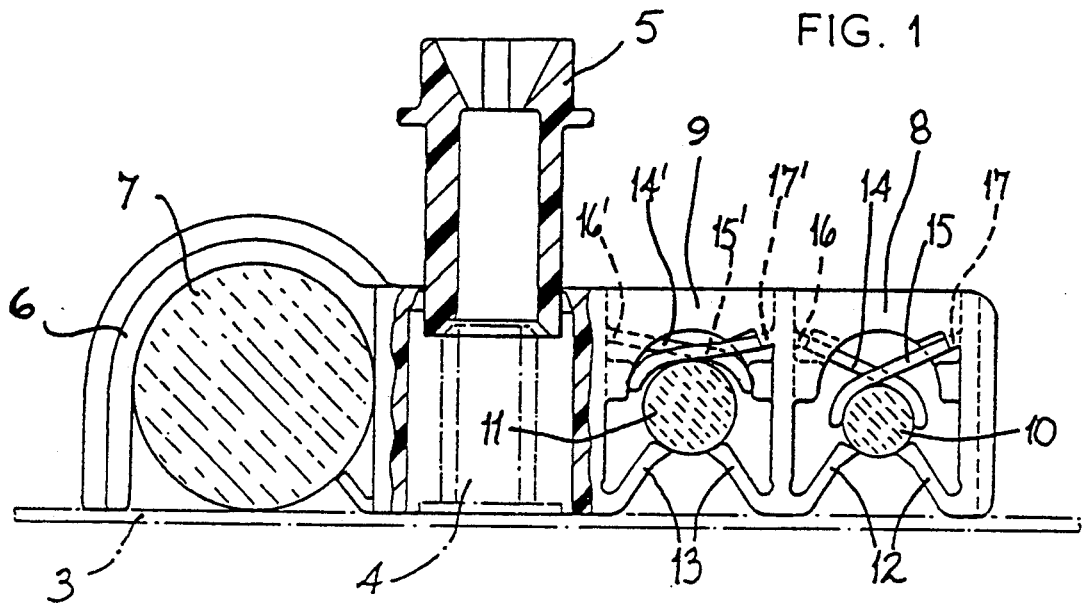
FIG. 1 is a part cross-section of a clip unit incorporating two clips according to the invention.
Figure 2:
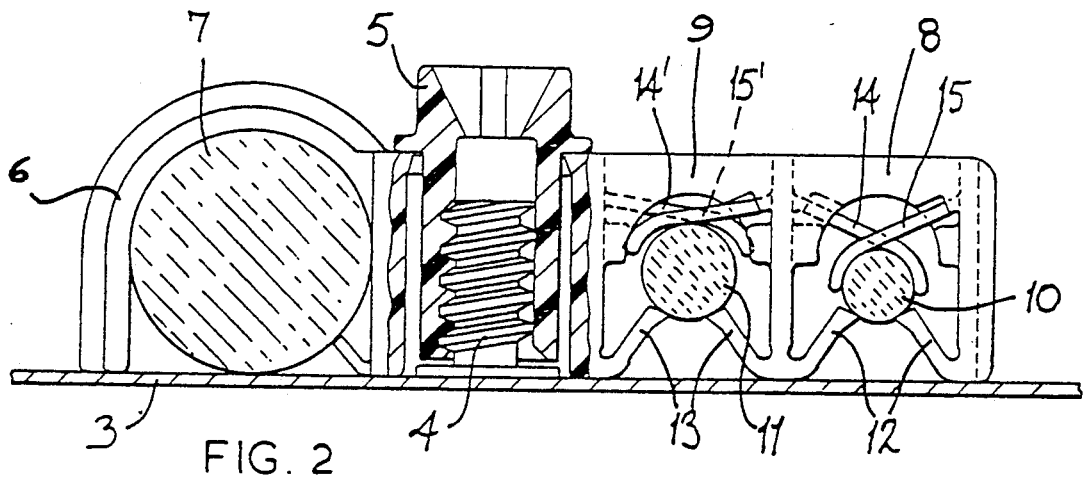
FIG. 2 shows the clip of FIG. 1 when installed on a stud.
Figure 3:
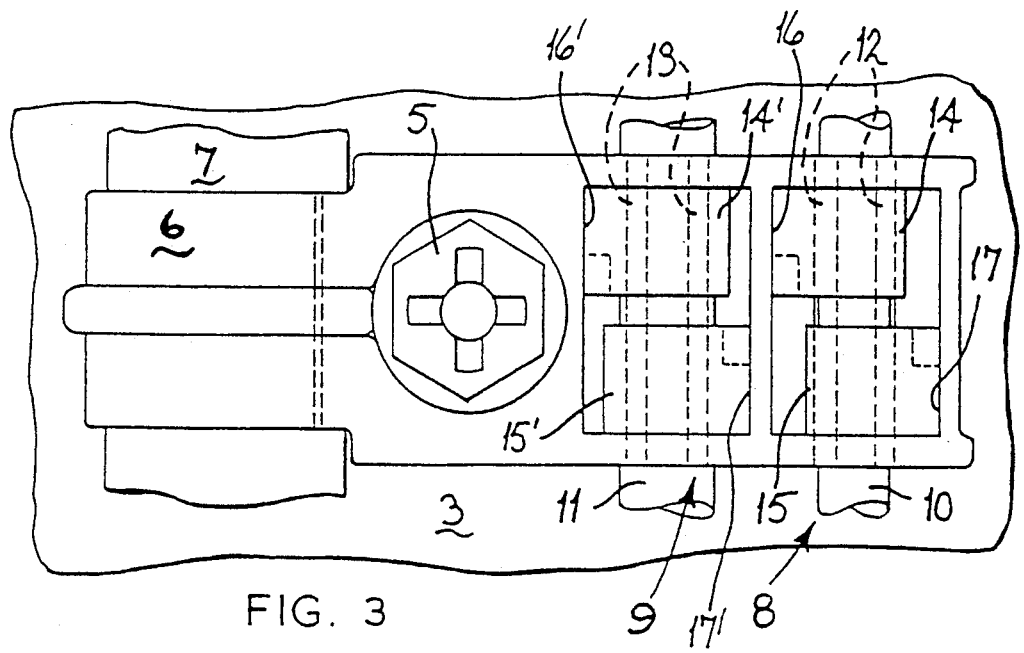
FIG. 3 is a plan view of the clip of FIG. 1.

The clip unit is secured to the surface 3 to which it is to be attached by means of a stud 4 and the clip unit is attached to stud 4 by means of cap 5 of plastics material which is pushed on to stud 4 stud as shown in FIG. 2.

On one side of the clip unit is a clip 6 designed to hold a cable or pipe 7 of 16.0 mm diameter.

On the other side of the clip unit are a pair of clips 8, 9 each designed in accordance with the invention to hold a cable or pipe 10, 11 of a diameter in the range 4.75 mm–8.0 mm.

Clip 8 is provided with a pair of flexible supports 12 and clip 9 is provided with a pair of flexible supports 13. Curved flexible fingers 14, 15 are attached at ends 16, 17 respectively, to opposing walls of clip 8 and, similarly, curved flexible fingers 14', 15' are attached at ends 16', 17' to opposing walls of clip 9. Each pair of curved, flexible fingers 14, 15 and 14', 15' is arranged side by side in a scissor-like manner and are formed so that their natural resilience urges fingers 14, 15 towards flexible supports 12 and fingers 14', 15' towards flexible supports 13.

In order to locate the pipes 10, 11 in clips 8, 9 respectively, the pipes 10, 11 are first pressed from outside the clips through the supports 12, 13 towards the flexible fingers 14, 15 and 14', 15'. The resilience of the pair of supports 12 allows the pipe 10, which is 4.75 mm diameter to pass between the supports 12 and to move together after passage of the pipe 10, thus restraining the pipe 10 from leaving the clip 8.

The admission of pipe 10 forces flexible fingers 14, 15 away from the supports 12, but the natural resilience of the fingers 14, 15 maintains contact with pipe 10 so that it is securely held between supports 12 and flexible fingers 14, 15. Moreover, the scissor-like arrangement of flexible fingers 14, 15 automatically ensures that the pipe 10 is located in the centre of the clip between supports 12 and flexible fingers 14, 15.

In a similar fashion, pipe 11 of 8.0 mm diameter is pressed between supports 13 and then securely held between supports 13 and flexible fingers 14', 15' although the larger pipe 11 deflects the flexible fingers 14', 15' further than pipe 10 deflects the flexible fingers 14, 15. Again, the scissors-like arrangement of flexible fingers 14', 15' ensures that the pipe 11 is located in the centre of the clip between supports 13 and flexible fingers 14', 15'. However, the clips of the invention can in this way support pipes of the range of different sizes illustrated by pipe 10 and pipe 11.

We claim:

1. Clip for the retention of pipe or cable of a range of diameters of thicknesses comprising a first pair of resilient support members spaced apart by a distance smaller than the diameter of the smallest object to be retained and supported, said resilient support members being temporarily displaceable to allow the object to be pressed between said support members, said support members resuming their original position after the passage of the object so as to retain the object, and further comprising as opposing resilient support members a pair of flexible fingers which are arranged scissor-wise side-by-side and adapted to urge the object towards said first pair of resilient support members so that the object is maintained in contact therewith.

2. A clip according to claim 1, wherein said first pair of resilient support members take the form of relatively short resilient fingers.

3. Clip according to claim 1, wherein the first pair of resilient support members are flexible, fin-like members extending across the clip.

* * * * *